INVENTOR.
George E. Durand
BY Rolland L. Trott ATTORNEY.

July 16, 1929.　　　G. E. DURAND　　　1,720,825

CRANE JACK

Filed March 1, 1928　　　2 Sheets-Sheet 2

INVENTOR.
George E. Durand
BY
Rolland S. Trott
ATTORNEY.

Patented July 16, 1929.

1,720,825

UNITED STATES PATENT OFFICE.

GEORGE E. DURAND, OF DENVER, COLORADO.

CRANE JACK.

Application filed March 1, 1928. Serial No. 258,391.

My invention relates to crane-jacks, and more especially to crane-jacks for use with automobiles and other vehicles.

A jack is a device used for lifting a weight, such as an automobile, for instance, and is generally to be placed directly under the weight to be lifted.

A crane is a device for lifting a weight, and is provided with an arm supported at one end, generally by means of a pivotal mounting, the free end of the arm being adapted to be attached to the weight by means of a chain or other proper connection since the weight is generally under the arm. A crane may be stationary but is very generally mounted upon casters or wheels or is made movable by some other mounting.

A crane-jack provides a combination of the functions of the jack and of the crane in certain ways. That is, the actuating mechanism of the crane-jack may be under, but need not be directly under the weight to be lifted; and the free end of the crane arm of the crane-jack may be under instead of above the weight to be lifted.

In the railroad shipment of small automobiles, the freight cost can be generally reduced by the on-end method of loading.

That is, the wheels of the automobiles are removed and the automobiles then stored cross-wise in the freight car, with the front axle or end of the frame of each automobile resting upon the floor at one side of the freight car, and the rear axle or end of the frame resting against the opposite side of the freight car near the roof, the auto then being carefully blocked in place.

The next automobile is then put in place, but with the front of it upon the floor of the freight car on the same side as the rear of the first automobile; thus the two auomobiles forming an X when viewed from the other end of the freight car. The next automobile is loaded similar to the first, so that by this staggered on-end method of loading small automobiles, three of them can be placed in each end of a freight car, with one in the central space, making seven small automobiles to each freight car.

By the other or double deck method of loading, two automobiles are placed in each end of the freight car, one upon the scaffold directly above the other, with one automobile in the central space, making five small automobiles to each freight car.

Thus, by the on-end method a freight car is made to carry seven automobiles instead of five.

In order to use the on-end method of loading economically, however, it is necessary to have some quick and cheap method of handling the automobiles, that is, of loading in the on-end position, and of taking them out of the freight car when they have been loaded in the on-end position.

The only automobile in which this has been possible to date is no longer manufactured; its handling, however, was formerly made possible by a steel lower half of the flywheel housing.

This was nested in a cradle or cup on a wheeled truck which supported the entire automobile, and with the assistance of four or five men the automobile could then be loaded on end; and with the same men and the cradle truck it could also be unloaded from the on-end position.

But, at present no automobiles are loaded and shipped in the on-end position.

In garages and automobile repair shops it is customary to have pits into which a workman can climb when working upon the engine bearings.

At filling stations and service stations hydraulic or rotary lifts are sometimes installed upon which an automobile may be driven, and which will then lift the automobile high enough for a workman to get underneath, the more easily to attend to the proper inspection and greasing of the chassis.

The object of this invention is to provide a crane-jack with which one man and an assistant to steady the automobile when it is being moved after it is lifted, may lift any small automobile, take off the wheels, and load the automobile in a freight car in the on-end position, or with which one man and an assistant can unload any small automobile that is loaded in the on-end position, or with which they may load any automobile by the double deck method of loading, as well as unload same.

A further object is to provide a crane-jack with which one man may easily lift the front end of an automobile so as to make the engine bearings easily accessible without the use of a pit, thus placing the bearings in a more convenient position than when they are directly overhead.

A further object is to provide a crane-jack with which one man may easily lift an automobile high enough to permit easy access below it for inspection and greasing of the chassis.

A further object is to provide such a crane-jack in which the automobile lifted may be tilted to and locked at any desired angle, either for loading, unloading, work on the engine bearings or any of the mechanism that is accessible from below, or for inspection or greasing.

I accomplish the above objects by providing a crane mounted on casters, a special jack for operating the crane arm, and a cradle mounted on the crane arm by a lockable pivotal mounting, and adapted to be attached to an automobile frame, the entire crane-jack when in the down position being low enough to pass under the running board of an automobile, and narrow enough to pass in between the rear or the front wheels of an automobile.

This construction will be described more in detail below and is fully illustrated in the drawings, in which:—

Figure 3:
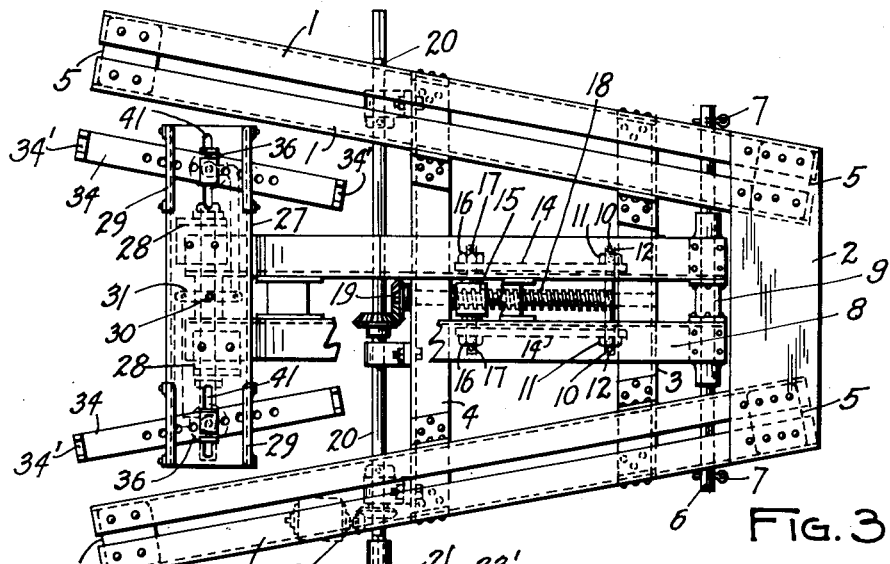
Figure 3 is a plan view of my crane-jack in the down position.

In Figure 3 it will be seen that the frame of the crane-jack is composed of the side members 1, the cross member 2, and the cross braces 3 and 4. As shown, the frame is composed of members constructed of structural steel, riveted together. But it may be welded together, or bolted together or may be constructed of cast or pressed metal, just so a frame of sufficient strength and reliability is provided.

The casters 5 are to be properly attached to the four corners of the frame and are to be of any approved construction of sufficient strength and durability and of the swiveling type, so that the crane-jack may be easily propelled in any direction, the casters swiveling to any new direction by the movement of the crane-jack along the floor.

The side members 1 are provided with aligned holes to receive the pivot shaft 6, which is held in place by the cotter pins 7, or in any other proper manner.

Upon the pivot shaft 6 is pivotally mounted the arm 8, having a bearing upon the shaft 6 for substantially the entire distance between the side members 1.

The two members of the arm 8 are provided with aligned holes to receive the lifting shaft 10, which is held in place by the nuts 11, the nuts being locked by the cotter pins 12.

As shown, the arm 8 is constructed of parallel members of structural steel, held together by proper riveted or bolted ties or braces and by means of the bearing 9, to which the arm members are riveted.

But, welding in place of rivets or bolts may be used if desired, or the arm 8 may be made of cast or pressed metal, just so an arm of sufficient strength and reliability is provided.

Upon the lifting shaft 10 are mounted one end of the lifting links 14, the other ends of the links 14 being pivotally mounted on the nut 15, and held in place by the nuts 16, which are locked by the cotter pins 17.

The jack screw 18 is provided with the bevel gear 19, and is properly mounted at both ends on the frame. The nut 15 is threaded upon the jack screw 18, and rotation of the screw is adapted to move the nut 15 along the screw and thereby through the lifting links 14, and the lifting shaft 10 cause the arm 8 to rise by pivotal movement about the pivot shaft 6.

The bevel gear shaft 20 is mounted in bearings supported on the frame, and its ends which extend slightly beyond the side members 1 at that point are squared to receive the ratchet wrench 21.

If the wrench to be used is of hexagonal cross-section or of any other shape, the shaft ends will of course be made to be received thereby.

The wrench 21 is provided with the toothed ratchet wheel 22 and the pivotally mounted pawl 23, which is held in either of two positions by the plunger 24 impelled by the spring 25 and acting upon one side or the other side of the point 26 of the pawl 23.

The reverse action of the pawl is obtained by forcing the point 26 to pass the plunger 24. This permits the operator to set the pawl to get the most convenient action for the operation of the wrench 21 by the handle 23'.

The double ended bevel gear shaft 20 allows the wrench 21 to be used on either side of any automobile being worked with.

The cradle is provided with the base 27, the cradle shaft supports 28, the frame bracket guides 29, the equalizer pivot pin 30, the equalizer lever 31, the equalizer rod pins 32, the equalizer rods 33, the frame brackets 34, the frame hooks 35, the frame hook wheels 36, the frame hook locks 37, the frame hook lock pivot 38, and the frame hook lock locking pin 39.

The frame hooks 35 pass through the holes in the frame brackets 34, through the slots 41 of the base 27 and through the holes of the equalizer rods 33. The frame hook wheels are threaded upon the frame hooks 35.

The frame brackets 34 are provided with ends recessed as at 34' so that each frame bracket will receive the side frame member of the automobile to be lifted, and they are held in place on the base 27 by the guides 29, the hooks 35, and the rods 33.

A plurality of holes is provided in the frame brackets to receive the hooks 35. This is for the reason that with some automobiles, when the cradle is placed under the frame in the position to give the balance desired for the work contemplated, some bracket or other part upon the frame may interfere with the proper fitting of the frame brackets 34 with the frame.

In such a case the frame bracket is question may be shifted by placing the hook 35 through the proper hole in the bracket, without having to move the cradle itself from the point of desired balance under the automobile.

The frame bracket guides 29 allow the frame brackets 34 to swing about the hooks 35 so they may fit properly upon either a parallel sided or tapered frame.

The slots 41 in the base 27 permit the frame brackets 34 to be moved together or apart to fit any width of frame, and the connection between the frame brackets 34 formed by the hooks 35, the equalizer rods 33, pins 32, equalizer lever 31 and equalizer pivot pin 30, maintain the two frame brackets 34 at all times equally spaced from the center line of the base 27, so that the automobile lifted will be laterally balanced.

Figure 5:
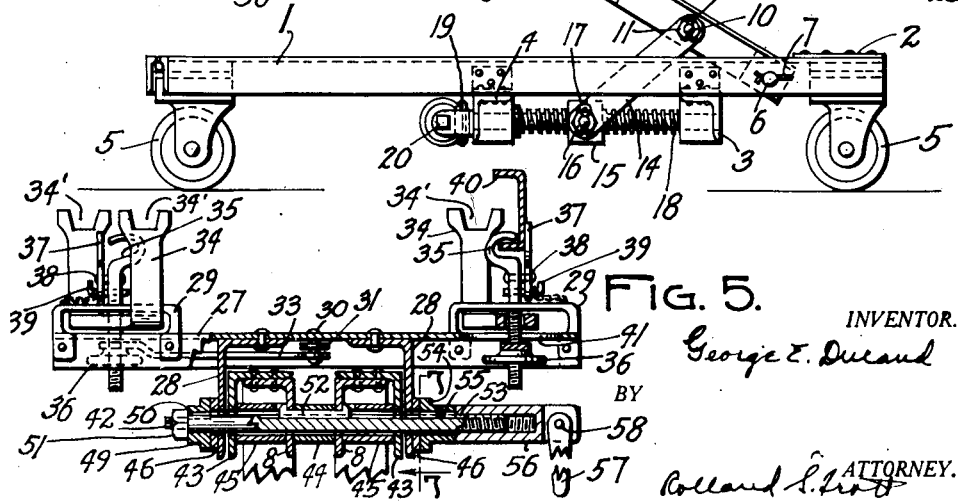
Figure 5 is a more detailed elevation and partial section of the cradle and its pivotal mounting on the crane arm, and showing a section of one side frame member of an automobile.

In fitting the cradle to the frame of an automobile, the frame brackets 34 are fitted upon the lower surface of the frame, the recesses 34' receiving the side members, the hooks 35 are released by movement of the wheels 36 and are then swung in till they are over the lower web of the frame side members as indicated by one hook in Figure 5.

The hook locks 37 are then swung about their pivots 38 till they are in the position shown, that is, outside of the vertical web of the frame side member and in a vertical position.

The hook lock locking pins 39 are then put in place, thus securely locking the locks 37, which in turn lock the hooks 35 in place over the horizontal web of the frame side member and against the vertical web thereof.

The side frame members, of course, rest in the recesses 34', but in Figure 5 the simple section of one side member as it is held by the hook 35 and the lock 37, is shown for the sake of clearness.

The wheels 36 are then turned till the frame is drawn firmly down into the recesses 34' of the frame brackets 34, and the cradle is thus firmly secured to the automobile frame.

Because of the construction of the cradle as described above, this is possible with any of the standard makes of automobiles now upon the market.

To the cradle shaft supports 28 are riveted the locking plates 46 by the rivets 47. See Figure 5 and Figure 7. The plates 46 are provided with shallow radial teeth 48.

All parts of the cradle described are shown as constructed of structural steel, riveted or bolted together, but they may be welded together, or made of cast or pressed metal as desired, provided sufficient strength and reliability are provided and the function of the cradle is not interfered with.

The crane arm 8 is provided with the members 43, which, with the members of the arm 8 are provided with aligned holes to receive the cradle shaft 42. The spacers 44 and 45 are used to surround the shaft 42, and maintain the members 43 and the parts of the arm 8 in proper relation.

This construction, though shown of structural steel riveted together may be welded or bolted together or may be made of cast or pressed metal or in any other suitable manner so long as the required strength and reliability are provided. It will be noted that in Figure 3 the members 43 are left out for the sake of clearness.

The locking washer 49 is provided with shallow radial teeth similar to the teeth 48 of the plate 46, and adapted to mesh therewith, and is keyed upon the cradle shaft 42 by the key 50, and is held securely upon the shaft 42 by the nut 51.

The shaft 42 is provided with the keyway 53 to receive the key 52 which is also fitted to members of the arm 8. This construction prevents relative rotary movement of the shaft 42 and the arm 8, while permitting axial movement of the shaft with respect to the arm.

The sleeve 54 is provided with shallow radial teeth similar to the teeth 48 of the plate 46 and adapted to mesh therewith, and is keyed to the shaft 42 by the key 55, slidable in the keyway 53, but not with respect to the sleeve 54.

The adjusting nut 56 is threaded upon the shaft 42 and at the end is slotted to receive the adjusting handle 57, pivoted on the nut 56 by the pin 58.

When it is desired to lock the cradle in any position the handle 57 is swung about the pivot 58 till it is at right angles to the shaft 42 and is then used to turn the nut 56 tight against the sleeve 54.

This locks the cradle solidly to the arm 8 by means of the radial teeth 48 of the plates 46, meshing with the teeth of the washer 49 and of the sleeve 54, since the washer 49 and the sleeve 54 are both keyed to the shaft 42 and the shaft 42 is keyed to the arm 8.

When it is desired to shift the cradle about the cradle shaft 42, the nut 56 is released enough to allow the shallow teeth of the plates 46 and the washer 49 and sleeve 54 to come out of mesh.

When the arm 8 is in the down position the handle 57 may be swung about its pin 58 till it is aligned with the shaft 42 and will not contact with the floor and will not prevent the arm 8 from coming to the down position.

Or the pin 58 may be made removable if desired. Or the slot left by the removal of the pin 58 and the handle 57 may be used as a slot for a large screw driver.

The cradle may be held from going too far in one direction while being permitted to swing freely in the other direction, by means of the chain 59, attached to the base 27, and to the arm 8 by the bolt or pin 60, which is passed through a link of the chain at the desired length.

It will now be seen that I have provided a crane-jack which accomplishes all the objects sought.

It may be run under a small automobile from either side; the cradle can be properly attached to any width or taper of frame and positioned for the balance desired regardless of obstructions on the under face of the frame; the automobile can then be lifted by operation of the ratchet handle 23' from either side of the automobile.

The wheels can then be removed, and as the automobile is lifted higher the desired angle of tilt may be obtained by swinging it upon the cradle about the cradle shaft 42 to the desired position and then locking it there by the adjusting nut handle 57.

Or, the cradle may be attached forward of the center of gravity of the automobile so that as the arm 8 raises the front wheels only of the automobile will be raised, so that a workman may easily and conveniently get at the engine bearings without the necessity of a pit, and with the work partly in front of him instead of directly over his head.

Or, the crane-jack may be used to raise an automobile in a horizontal position so that a workman may easily and conveniently get under it for inspection and greasing of the chassis.

And finally, the crane-jack may be used to lift an automobile and it may be then set and locked at any desired tilt or angle for loading, unloading, or work of any kind upon the automobile.

Figure 1:
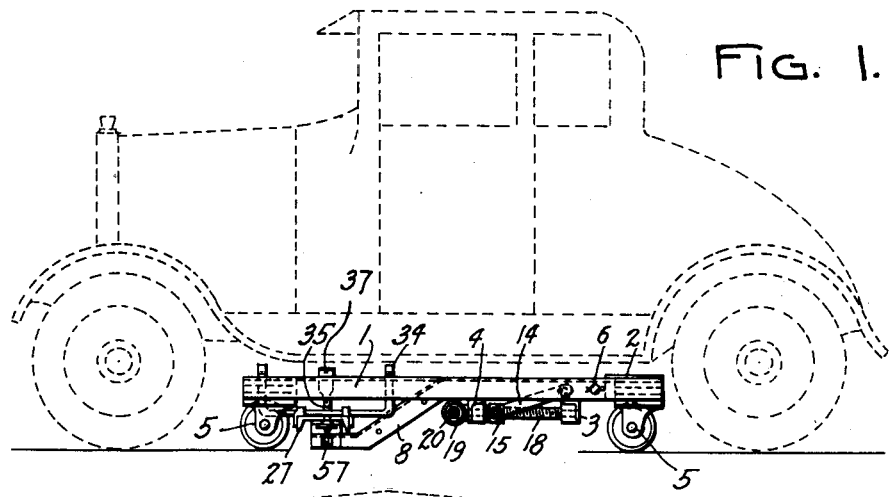
Figure 1 is a side view of my crane-jack in the down position, and as it would appear when being rolled under the running board of an automobile, the automobile being indicated by dotted lines.

It will also be seen that in the down position as shown in Figure 1, the lifting links 14 are nearly on center and would lift in a most inefficient way.

In raising from this position, however, no weight but that of the crane arm and cradle is lifted.

Figures 4, 6, 7:
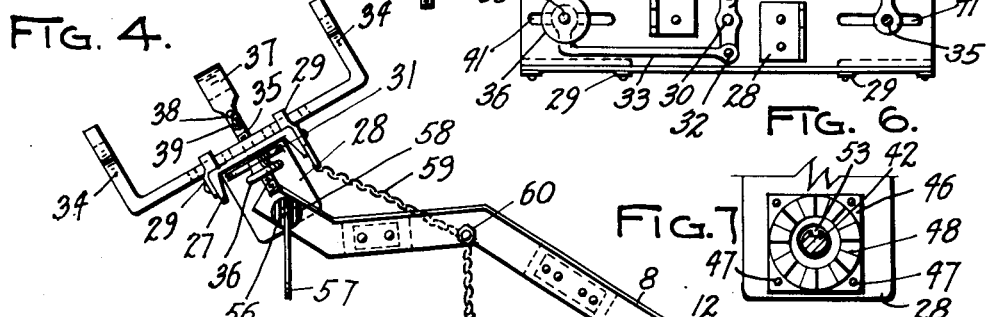
Figure 4 is a side elevation of my crane-jack with the crane arm only partially elevated.
Figure 6 is a bottom plan, and partial section of the cradle assembly.
Figure 7 is a section on the line 7—7 of Figure 5.

When the cradle is attached to the frame of an automobile, the position of the crane arm will be similar to that shown in Figure 4, or perhaps a little lower, and with the cradle horizontal.

In this position it will be noted that the angle of the lifting links 14 with and their relation to the arm 8 and the screw 18 is such as to give a very powerful action.

Figure 2:
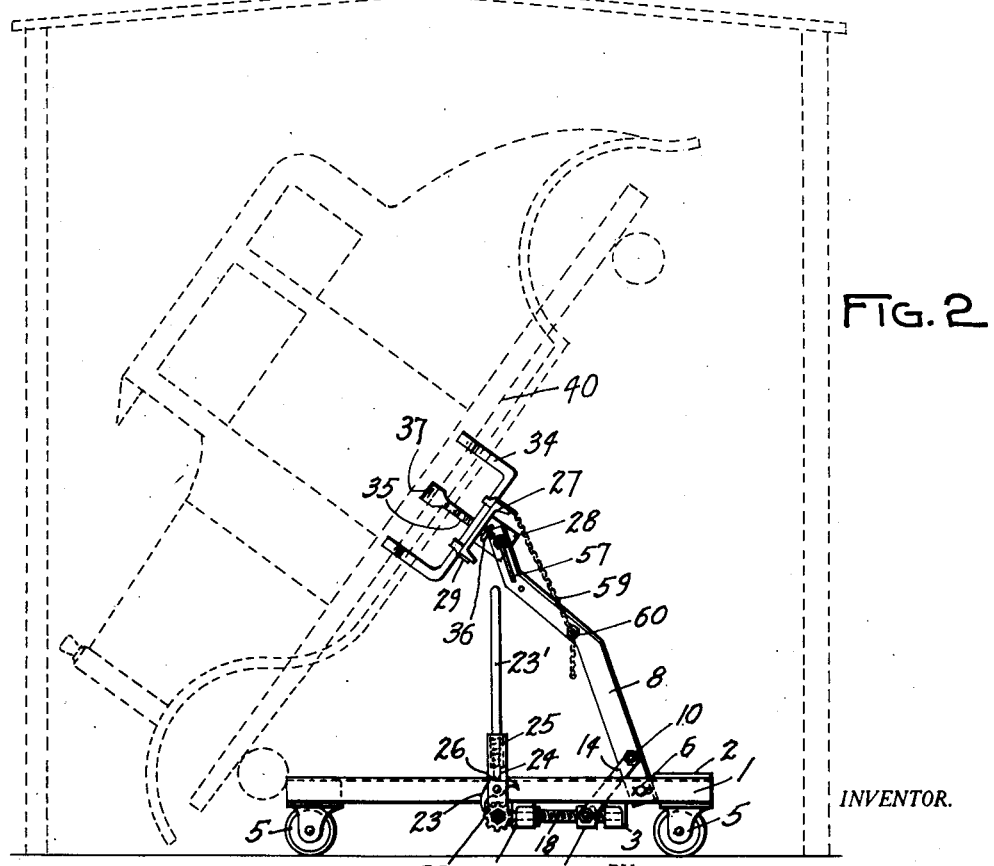
Figure 2 shows my crane-jack in the up position, and as it would appear when loading a small automobile in a freight car in the on-end position; the automobile being shown by dotted lines ready to be put in the final position and blocked in place in the freight car, part of which is also shown by dotted lines.

This continues with very little decrease to the up position shown in Figure 2.

That is, the screw 18 does not carry the weight by direct axial pressure, but by combined axial and lateral pressure, which greatly decreases the hand power or other power required to lift a given weight.

I am well aware of many variations that might be made in my crane-jack. An electric motor 61 might be mounted upon the frame or arm and properly connected to drive the screw 18 as desired, as indicated by dotted lines in Figure 3. This motor, when used, would make for faster crane action, the hand operation still being available for moving the crane arm to the exact position required.

The hooks 35 may, of course, be bent to hook over the top of the frame of the automobile, in which case the lock 37 might be or might not be used. But, inasmuch as some automobiles attach the running board splash pans to the top of the frame, such hooks would injure these splash pans, whereas when the hook engages the lower web of the frame it will operate with any automobile.

I am well aware that there are many other variations that might be made by any intelligent mechanic, once my invention is disclosed to him, such as changes in material, proportions, and details of construction, but these amount to no more than mechanical equivalents and therefore I do not wish to be limited to the exact forms, and details of construction shown, but what I claim as new, and desire to protect by Letters Patent, is as follows:—

1. In combination, a portable crane provided with a pivotally mounted arm having a free end and with means connected to the arm and adapted to give it pivotal movement, a cradle pivotally mounted upon said free end and having brackets adapted to receive the frame of a vehicle, hooks carried by the cradle and adapted to engage said vehicle and force the engagement of the frame with said brackets, manually operated means for adjusting said engagement, and manually operated means adapted to lock the pivotal mounting of the cradle on the free end of the crane arm.

2. A slotted cradle pivotally mounted upon a crane arm, guides attached to the cradle, recessed brackets movably mounted between the guides and the cradle and adapted to receive the frame of a vehicle in their recesses, hooks passing through said brackets and acting as pivotal mountings therefor, and passing through the slots of the cradle and adapted to engage said frame, and manually operated means threaded upon said hooks and adapted to force engagement of the frame and said brackets, and manually operated means adapted to lock the pivotal mounting of the cradle on the said crane arm.

3. A slotted cradle pivotally mounted upon a crane arm, guides attached to the cradle, recessed brackets movably mounted between the guides and the cradle and adapted to receive the frame of a vehicle in their recesses, hooks passing through said brackets and acting as pivotal mountings therefor, and passing through the slots of the cradle and adapted to engage said frame, and manually operated means threaded upon said hooks and adapted to force engagement of the frame and said brackets, and manually operated means adapted to lock the pivotal mounting of the cradle on the said crane arm, and a two armed lever pivotally mounted on the cradle and rods each pivotally mounted on an end of the lever and on one of said hooks.

4. A cradle provided with means to engage a vehicle frame and with manually operated means to force said frame into said engagement, a movable arm, a pivotal mounting between the cradle and the arm, and manually operated locking means adapted to lock said pivotal mounting, a base upon which the arm is pivotally mounted, and means carried by the base and in operative engagement with the arm and adapted to give the arm pivotal movement.

5. A cradle provided with means adapted to attach the cradle to the frame of a vehicle, a movable arm, a pivotal mounting between the cradle and the arm, means to control the angular position of the cradle upon said pivotal mounting, a base upon which the arm is pivotally mounted and means carried by the base and in operative engagement with the arm and adapted to give the arm pivotal movement.

6. A cradle provided with means adapted to attach the cradle to a vehicle for lifting same, a movable arm, a pivotal mounting between the cradle and the arm, means to control the angular position of the cradle upon the said pivotal mounting, a base upon which the arm is pivotally mounted and means carried by the base and in operative engagement with the arm and adapted to give the arm pivotal movement.

7. A slotted cradle pivotally mounted upon a crane arm, guides attached to the cradle, recessed brackets movably mounted between the guides and the cradle and adapted to receive the frame of a vehicle in their recesses, hooks passing through said brackets and acting as pivotal mountings therefor, and passing through the slots of the cradle and adapted to engage said frame, means adapted to lock the hooks in said engagement, manually operated means threaded upon said hooks and adapted to force engagement of the frame and said brackets, and manually operated means adapted to lock the pivotal mounting of the cradle on the said crane arm, and a two armed lever pivotally mounted on the cradle, and rods, each pivotally mounted on an end of the lever and on one of said hooks.

8. A portable crane having an arm pivotally mounted adjacent one end upon a frame, and provided with means to move said arm about its pivotal mounting, and a cradle provided with means adapted to attach the cradle to a vehicle for lifting same and pivotally mounted on the end of the arm opposite the end pivotally mounted on the frame, and locking means to maintain the angular position of the cradle upon its pivotal mounting on the arm.

9. A cradle provided with means adapted to attach the cradle to a vehicle for lifting same, a movable arm, a pivotal mounting between the cradle and the arm, means to control the angular position of the cradle upon the said pivotal mounting, means including a frame upon which the movable arm is pivotally mounted.

10. A cradle provided with means to engage a vehicle frame and with manually operated means to force said frame into said engagement, a movable arm, a pivotal mounting between the cradle and the arm, manually operated locking means adapted to lock said pivotal mounting, and a frame upon which the arm is pivotally mounted and means mounted on the frame and in operative engagement with the arm and providing control of the angularm position of the arm on the frame.

11. A slotted cradle pivotally mounted upon a crane, a crane arm adapted to carry said cradle, guides attached to the cradle, recessed brackets movably mounted between the guides and the cradle and adapted to receive the frame of a vehicle in their recesses, hooks passing through said brackets and acting as pivotal mountings therefor, and passing through the slots of the cradle and adapted to engage said frame, manually operated means threaded upon said hooks and adapted to force engagement of the frame and said brackets, manually operated means adapted to lock the pivotal mounting of the cradle on the said crane arm, a two armed lever pivotally mounted on the cradle, rods each pivotally mounted on an end of the lever and on one of said hooks, and means, including a frame adapted to provide a pivotal mounting for said crane arm and to control its angular position on said pivotal mounting.

12. A slotted cradle pivotally mounted upon a crane arm, guides attached to the cradle, recessed brackets movably mounted between the guides and the cradle and adapted to receive the frame between the guides and the cradle and adapted to receive the frame of a vehicle in their recesses, hooks passing through said brackets and acting as pivotal mounting therefor, and passing through the slots of the cradle and adapted to engage said frame, means adapted to lock the hooks in said engagement, manually operated means threaded upon said hooks and adapted to force engagement of the frame and said brackets, and manually operated means adapted to lock the pivotal mounting of the cradle on the said crane arm, a double ended lever pivotally mounted on the cradle, rods, each pivotally mounted on an end of the lever and on one of said hooks, and means including a frame adapted to provide a pivotal mounting for said crane arm and to control its angular position on said pivotal mounting.

13. A slotted cradle pivotally mounted upon a crane arm, guides attached to the cradle, recessed brackets movably mounted between the guides and the cradle and adapted to receive the channel side members of the frame of a vehicle in their recesses, hooks passing through said brackets and acting as pivotal mountings therefor, and passing through the slots of the cradle and adapted to hook over the lower horizontal web of said frame channel from the open side thereof, locking means mounted on said hooks and adapted to extend adjacent the other side of said channel from said hooks to maintain the contact of said hooks with said channel, manually operated means threaded upon said hooks and adapted to force engagement of the said channels and said brackets, and manually operated means adapted to lock the pivotal mounting of the cradle on the said crane arm, and a two-armed lever pivotally mounted on the cradle, and rods each pivotally mounted on an end of the lever and on one of said hooks.

14. A slotted cradle pivotally mounted upon a crane arm, guides attached to the cradle, recessed brackets movably mounted between the guides and the cradle and adapted to receive the channel side members of the frame of a vehicle in their recesses, hooks passing through said brackets and acting as pivotal mountings therefor, and passing through the slots of the cradle and adapted to hook over the lower horizontal web of said frame channel from the open side thereof, locking means mounted on said hooks and adapted to extend adjacent the other side of said channel from said hooks to maintain the contact of said hooks with said channel, manually operated means threaded upon said hooks and adapted to force engagement of the said channels and said brackets, manually operated means adapted to lock the pivotal mounting of the cradle on the said crane arm, and a double ended lever pivotally mounted on the cradle, rods each pivotally mounted on an end of the lever and on one of said hooks, and means including a frame adapted to provide a pivotal mounting for said crane arm and to control its angular position on said pivotal mounting.

15. A cradle pivotally mounted on a crane arm, means on the cradle adapted to engage from below the frame of a vehicle, means on the cradle adapted to engage said frame and maintain its engagement with said first means, means to control the angular position of the cradle upon its pivotal mounting on the crane arm, and means including a frame adapted to provide a pivotal mounting for said crane arm and to control its angular position on said pivotal mounting.

16. A portable crane including a frame, an arm pivotally mounted adjacent one of its ends upon said frame, means mounted on the crane and adapted to move said arm about its pivotal mounting, means pivotally mounted on the arm adjacent the end opposite its pivotal mounting on the frame, adapted to attach to a vehicle for lifting same, and locking means to maintain the angular position of said first named means upon said arm.

In testimony whereof I affix my signature.

GEORGE E. DURAND.